United States Patent
Tsuji et al.

(10) Patent No.: US 10,693,145 B2
(45) Date of Patent: Jun. 23, 2020

(54) CATALYST FOR AIR ELECTRODE FOR METAL-AIR SECONDARY BATTERY AND AIR ELECTRODE

(71) Applicants: NATIONAL UNIVERSITY CORPORATION HOKKAIDO UNIVERSITY, Sapporo-shi, Hokkaido (JP); HITACHI ZOSEN CORPORATION, Osaka-shi (JP)

(72) Inventors: Etsushi Tsuji, Sapporo (JP); Teruki Motohashi, Sapporo (JP); Hiroki Habazaki, Sapporo (JP); Hiroyuki Noda, Sapporo (JP); Tatsuya Takeguchi, Sapporo (JP)

(73) Assignees: NATIONAL UNIVERSITY CORPORATION HOKKAID UNIVERSITY (JP); HITACHI ZOSEN CORPORATION (JP)

(*) Notice: Subject to any disclaimer, the term of this patent is extended or adjusted under 35 U.S.C. 154(b) by 127 days.

(21) Appl. No.: 15/114,608

(22) PCT Filed: Jan. 30, 2015

(86) PCT No.: PCT/JP2015/052649
§ 371 (c)(1),
(2) Date: Jul. 27, 2016

(87) PCT Pub. No.: WO2015/115592
PCT Pub. Date: Aug. 6, 2015

(65) Prior Publication Data
US 2016/0344037 A1  Nov. 24, 2016

(30) Foreign Application Priority Data
Jan. 31, 2014 (JP) .................. 2014-017891

(51) Int. Cl.
*H01M 4/90* (2006.01)
*H01M 12/08* (2006.01)
(Continued)

(52) U.S. Cl.
CPC ......... *H01M 4/9016* (2013.01); *H01M 4/42* (2013.01); *H01M 12/04* (2013.01); *H01M 12/08* (2013.01);
(Continued)

(58) Field of Classification Search
CPC ...... H01M 4/9016; H01M 4/42; H01M 12/04; H01M 12/08
See application file for complete search history.

(56) References Cited

U.S. PATENT DOCUMENTS

| | | | |
|---|---|---|---|
| 6,017,504 A | 1/2000 | Kaliaguine et al. | 423/263 |
| 2015/0303539 A1* | 10/2015 | Stevens | H01M 10/44 429/403 |

FOREIGN PATENT DOCUMENTS

| | | |
|---|---|---|
| CN | 102068993 A | 5/2011 |
| JP | 02-257577 | 10/1990 |

(Continued)

OTHER PUBLICATIONS

Sullivan et al ("Fluorine insertion reactions of the brownmillerite materials Sr2Fe2O5, Sr2CoFeO5, and Sr2Co2O5", Materials Research Bulletin (2012), vol. 47(9), p. 2541-2546).*

(Continued)

*Primary Examiner* — Jonathan G Jelsma
(74) *Attorney, Agent, or Firm* — Ostrolenk Faber LLP

(57) ABSTRACT

A novel transition metal oxide catalyst that is equivalent to precious metal catalysts, and an air electrode and an air secondary battery using this catalyst are provided. The catalyst is a catalyst for an air electrode including a brownmillerite-type transition metal oxide and represented by General Formula (1) below:

$$A_2B^1B^2O_5 \quad (1)$$

where A represents Ca, Sr, Ba, or a rare earth element(RE), $B^1$ is a metal atom that forms a tetrahedral structure together (Continued)

with oxygen atoms, and $B^2$ is a metal atom that forms an octahedral structure together with oxygen atoms. Disclosed are an air electrode for a metal-air secondary battery that includes the catalyst, and a metal-air secondary battery that includes an air electrode including the catalyst, a negative electrode including a negative electrode active material, and an electrolyte intervening between the air electrode and the negative electrode.

17 Claims, 9 Drawing Sheets

(51) Int. Cl.
*H01M 12/04* (2006.01)
*H01M 4/42* (2006.01)
*H01M 4/02* (2006.01)

(52) U.S. Cl.
CPC ...... *H01M 2004/027* (2013.01); *Y02E 60/128* (2013.01)

(56) References Cited

FOREIGN PATENT DOCUMENTS

| JP | 2002-158013 | | 5/2002 | |
| JP | 2002-520248 | A | 7/2002 | |
| JP | 2009-093983 | | 4/2009 | |
| JP | 2011121829 | A * | 6/2011 | |
| JP | 2013-120663 | | 6/2013 | |
| JP | 2013-127908 | | 6/2013 | |
| JP | 2014-225655 | A | 12/2014 | |
| WO | WO-2014083267 | A1 * | 6/2014 | ............ H01M 10/44 |

OTHER PUBLICATIONS

Derwent English abstract for JP 2013-120663 (2013).*
JPO English abstract for JP 2002-158013 (2002).*
Machine-assisted English translation for JP2002-158013 (Year: 2002).*
Extended European Search Report dated Jun. 23, 2017 in connection with European Patent Application No. 15 743 110.7.
Hyoungjeen Jeen et al: Orienting Oxygen Vacancies for Fast Catalytic Reaction, Advanced Materials, vol. 25, No. 44, Nov. 1, 2013.
Form PCT/IB/338 PCT Notification of Transmittal of Translation of the International Preliminary Report on Patentability dated Aug. 4, 2016 for International Application No. PCT/JP2015/052649.
F. Ramezanipour et al., "Systematic Study of Compositional and Synthetic Control of Vacancy and Magnetic Ordering in Oxygen-Deficient Perovskites $Ca_2Fe_{2-x}Mn_xO_{5+y}$ and $CaSrFe_{2-x}Mn_xO_{5+y}$", Journal of American Chemical Society, 2012, 134 pp. 3215-3227.
F. Ramezanipour et al., "Crystal and magnetic structures of the brownmillerite compound $Ca_2Fe_{1.039(8)}Mn_{0.962(8)}O_5$", Journal of Solid State Chemistry 182, 2009, pp. 153-159.
F. Ramezanipour et al., "Intralayer Cation Ordering in a Brownmillerite Superstructure: Synthesis, Crystal, and Magnetic Structure of $Ca_2FeCoO_5$", Chemistry of Materials 22, 2010, pp. 6008-6020.
P. Berastegui et al. "A Neutron Diffraction Study of the Temperature Dependence of $Ca_2Fe_2O_5$", Materials Research Bulletin, vol. 34, No. 2 pp. 303-314, 1999.
Y. Li et al., "Advanced Zinc-air batteries based on high-performance hybrid electrocatalysts", Nature Communications 4:1805, 2013, pp. 1-7.
J. Suntivich et al., "Design principles for oxygen-reduction activity on perovskite oxide catalysts for fuel cells and metal-air batteries", Nature Chemistry V. 3, pp. 546-550, 2011.
P. Jiang et al., "Intense Turquoise and Green Colors in Brownmillerite-Type Oxides Based on $Mn^{5+}$ in $Ba_2In_{2-x}Mn_xO_{5+x}$", Inorganic Chemistry, 2013, 52, pp. 1349-1357.
A. Nemudry et al., Topotactic Electrochemical Redox Reactions of the Defect Perovskite $SrCoO_{2.5+x}$ Chem. Mater, 1996, 8, pp. 2232-2238.
A. Nemudry et al., "Room Temperature Electrochemical Redox Reactions of the Defect Perovskite $SrFeO_{2.5+x}$", Chem. Mater, 1998, 10, pp. 2403-2411.
M. Zötzl et al., Stability and.. Properties of Brownmillerites $Ca2(Al,Mn,Fe)_2O_5$ and Perovskites $Ca(Mn,Fe)O_{3-x}$ in the System $Ca_2Fe_2O_5$—"$Ca_2Mn_2O_5$"—"$Ca_2Al_2O_5$", J. Am. Ceram. Soc. 89, 2006, pp. 3491-3497.
J. Suntivich et al., "A Perovskite Oxide Optimized for Oxygen Evolution Catalysis from Molecular Orbital Principles", Science 334, 2011, pp. 1383-1385.
Y. Lee et al., "Synthesis and Activities of Rutile $IrO_2$ and $RuO_2$ Nanoparticles for Oxygen Evolution in Acid and Alkaline Solutions", The Journal of Physical Chemistry Letters, 2012, 3, pp. 399-404.

* cited by examiner

ELECTROLYTIC SOLUTION : 0.1 mol dm$^{-3}$ KOH aq.

ELECTROLYTIC SOLUTION : 4.0 mol dm$^{-3}$ KOH aq.

| EXAMPLE 1 | EXAMPLE 2 | EXAMPLE 2 |
|---|---|---|
| SOLID PHASE REACTION METHOD (1200°C) | LIQUID PHASE REACTION METHOD (800°C) | LIQUID PHASE REACTION METHOD (600°C) |
| 0.13 m²/g | 3.85 m²/g | 18.9 m²/g |

(c) LIQUID PHASE REACTION METHOD (600°C, 18.9 m²/g)

(b) LIQUID PHASE REACTION METHOD (800°C, 3.85 m²/g)

MICRONIZED (a) SOLID PHASE REACTION METHOD (0.13 m²/g)

CATALYST FOR AIR ELECTRODE FOR METAL-AIR SECONDARY BATTERY AND AIR ELECTRODE

CROSS-REFERENCE TO RELATED APPLICATIONS

The present application is a 35 U.S.C. §§ 371 national phase conversion of PCT/JP2015/052649, filed Jan. 30, 2015, which claims priority to Japanese Patent Application No. 2014-017891, filed Jan. 31, 2014, the contents of both of which are incorporated herein by reference. The PCT International Application was published in the Japanese language.

TECHNICAL FIELD

The present invention relates to a catalyst for an air electrode for a metal-air secondary battery, and an air electrode. Furthermore, the present invention also relates to a metal-air secondary battery using the above-mentioned air electrode.

CROSS-REFERENCE TO A RELATED APPLICATION

The present application claims the benefit of priority to Japanese Patent Application No. 2014-17891 filed on Jan. 31, 2014, which is expressly incorporated herein by reference in its entirety.

BACKGROUND ART

In recent years, hydrogen production by decomposition of water using solar energy, and metal-air secondary batteries have been actively developed. In particular, the metal-air secondary batteries are expected as novel high-capacity storage batteries that will replace the currently mainstream lithium-ion secondary batteries, and research and development is being conducted to promote the widespread use thereof by about 2030. However, at present, in order to put them to practical application, various problems to be solved have arisen, and one example thereof is the development of a highly active catalyst for an oxygen evolution reaction (OER).

It is known that a large overvoltage is typically generated in the OER, and therefore, sufficient charging and discharging efficiency has not been obtained at present. Therefore, a highly active OER catalyst that greatly affects the voltage during charging urgently needs to be developed. As a catalyst that is highly active against the OER, precious metal catalysts such as Pt, $IrO_2$, and $RuO_2$ (2.5 to 3.0 $mA/cm^2$@1.6 V vs RHE, in a 0.1 mol $dm^{-3}$ NaOH aqueous solution) (Non-Patent Document 1) are generally known. However, since precious metals are expensive and the reserves are small, the development of an OER catalyst containing no precious metal is required in order to promote widespread use.

Recently, as a non-precious metal OER catalyst containing no precious metal, a perovskite-type transition metal oxide $ABO_3$ has been reported. The perovskite-type oxide includes a transition metal at the B site and has an octahedral structure in which the transition metal binds to six oxygen atoms. Recently, it is reported that the number of $e_g$ electrons in the transition metal at the B site is associated with OER activity, and that $La_{0.5}Ca_{0.5}CoO_{3-\delta}$ and the like in which the number of $e_g$ electrons is close to 1 are highly active (1.5 $mA/cm^2$@1.6 V vs RHE, in a 0.1 mol $dm^{-3}$ NaOH aqueous solution) (Non-Patent Document 2).

Non-Patent Document 1: Y. Lee, et al., J. Phys. Chem. Lett. 2012, 3, 399.
Non-Patent Document 2: Suntivich, et al., Science 2011, 334, 1383.
Non-Patent Documents 1 and 2 are expressly incorporated herein by reference in their entireties.

SUMMARY OF INVENTION

Technical Problems

However, it is reported that none of the transition metal oxide catalysts as mentioned in Non-Patent Document 2 exhibits OER activity higher than those of the precious metal catalysts, and thus the development of a novel group of transition metal oxides that are equivalent to the precious metal catalysts is required. Therefore, an object of the present invention is to develop a novel transition metal oxide catalyst that is equivalent to the precious metal catalysts, and to provide an air electrode and an air secondary battery using this catalyst.

Solution to Problem

As mentioned above, although the non-precious metal OER catalysts are expected as future novel energy materials, the OER activities of the currently reported perovskite-type oxides are still insufficient. In the present invention, it was found that using a brownmillerite-type transition metal oxide $A_2B_2O_5$, which has not attracted attention as an oxygen evolution catalyst, exhibited activity against the OER reaction that was equal to that of a Pt catalyst, and that in particular, using a brownmillerite-type transition metal oxide containing two types of transition metals exhibited activity higher than those of the precious metal catalysts, and thus the present invention was accomplished.

The followings are aspects of the present invention.

[1] A catalyst for an air electrode, including a brownmillerite-type transition metal oxide.

[2] The catalyst for an air electrode according to [1], wherein the brownmillerite-type transition metal oxide is represented by General Formula (1) below:

$$A_2B^1B^2O_5 \qquad (1)$$

where A represents Ca, Sr, Ba, or a rare earth element (RE), $B^1$ is a metal atom that forms a tetrahedral structure together with oxygen atoms, and $B^2$ is a metal atom that forms an octahedral structure together with oxygen atoms.

[3] The catalyst for an air electrode according to [2], wherein $B^1$ represents a 3d transition element, Al, Ga, or In, $B^2$ represents a 3d transition element, and $B^1$ and $B^2$ represent different elements.

[4] The catalyst for an air electrode according to [3], wherein the 3d transition element represented by $B^1$ is at least one metal atom selected from the group consisting of Fe, Co, Ni, and Zn, and the transition metal represented by $B^2$ is at least one metal atom selected from the group consisting of Fe, Co, Mn, Cr, Ni, Ti, and Cu.

[5] The catalyst for an air electrode according to [1] or [2], wherein the brownmillerite-type transition metal oxide is $Ca_2Fe_2O_5$, $Ca_2FeCoO_5$, $Ca_2FeMnO_5$, $Ca_2AlFeO_5$, $Sr_2Fe_2O_5$, $Sr_2Co_2O_5$, or $Ba_2In_{2-x}Mn_xO_{5+x}$ (x=0 to 0.7).

[6] The catalyst for an air electrode according to any one of [1] to [5], wherein a surface area is in a range from 0.1 to 100 m²/g.

[7] Use of the brownmillerite-type transition metal oxide according to any one of [1] to [6] as a catalyst for an air electrode.

[8] An air electrode for a metal-air secondary battery, including the catalyst according to any one of [1] to [6].

[9] The air electrode according to [8], containing the brownmillerite-type transition metal oxide as a catalyst for oxygen evolution, the air electrode further including a catalyst for oxygen reduction.

[10] A metal-air secondary battery including:
the air electrode according to [8] or [9];
a negative electrode containing a negative electrode active material;
and an electrolyte intervening between the air electrode and the negative electrode.

[11] The metal-air secondary battery according to [10], further including an air electrode for oxygen reduction including a catalyst for oxygen reduction.

Advantageous Effects of the Invention

With the present invention, it is possible to provide a catalyst for an air electrode that exhibits OER activity higher than or equal to that of Pt by using a brownmillerite-type transition metal oxide. Furthermore, with the present invention, it is also possible to provide an air electrode for a metal-air secondary battery using the above-mentioned catalyst for an air electrode, and a metal-air secondary battery using this air electrode.

DESCRIPTION OF EMBODIMENTS

Catalyst for Air Electrode

The present invention relates to a catalyst for an air electrode including a brownmillerite-type transition metal oxide.

Generally, a brownmillerite-type transition metal oxide $A_2B_2O_5$ includes a transition metal at the B site and has an octahedral structure in which the transition metal binds to six oxygen atoms and a tetrahedral structure in which the transition metal binds to four oxygen atoms as shown below.

Chemical Formula 1

Figure 11:
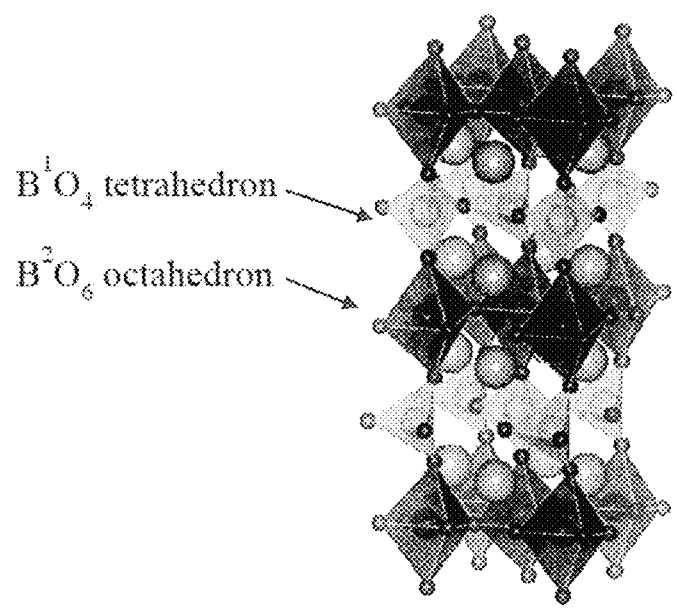
FIG. 11 illustrates a structure of a brownmillerite-type transition metal oxide $A_2B_2O_5$.

The brownmillerite-type transition metal oxide metal oxide $A_2B_2O_5$ structure is shown in FIG. 11.

In the present invention, the brownmillerite-type transition metal oxide can be represented by General Formula (1) below.

$$A_2B^1B^2O_5 \quad (1)$$

In Formula (1), A represents Ca, Sr, Ba, or a rare earth element (RE). Rare earth elements (RE) consist of two elements including Sc and Y, as well as fifteen lanthanoids including La, Ce, Pr, Nd, Pm, Sm, Eu, Gd, Tb, Dy, Ho, Er, Tm, Yb, and Lu. La, Pr, Nd, Sm, Eu, Gd, and the like, which have a relatively large ion radius, can be preferably used as the rare earth element (RE), for example.

In Formula (1), $B^1$ represents a metal atom that forms a tetrahedral structure together with oxygen atoms, and more specifically, $B^1$ represents a 3d transition element, Al, Ga, or In. The 3d transition element represented by $B^1$ is at least one metal atom selected from the group consisting of Fe, Co, Ni, and Zn, for example.

In Formula (1), $B^2$ represents a metal atom that forms an octahedral structure together with oxygen atoms, and more specifically, $B^2$ represents a 3d transition element. The transition metal represented by $B^2$ is at least one metal atom selected from the group consisting of Fe, Co, Mn, Cr, Ni, Ti, and Cu, for example.

$B^1$ and $B^2$ may represent an atom of the same element or atoms of different elements, and with some combinations of different elements, the catalyst for an air electrode may exhibit better activity. Examples of the brownmillerite-type transition metal oxide represented by General Formula (1) include $Ca_2Fe_2O_5$, $Ca_2FeCoO_5$, $Ca_2FeMnO_5$, $Ca_2AlFeO_5$, $Sr_2Fe_2O_5$, $Sr_2Co_2O_5$, and $Ba_2In_{2-x}Mn_xO_{5+x}$ (x=0 to 0.7).

The brownmillerite-type transition metal oxide can be synthesized using oxides of the metals as raw materials using a solid phase reaction method. The method will be described in Examples in detail. It is possible to refer to Non-Patent Documents 3 to 6 mentioned in Examples for the methods for synthesizing $Ca_2Fe_2O_5$, $Ca_2FeCoO_5$, and $Ca_2FeMnO_5$.

It is possible to refer to the documents below for the methods for synthesizing $Ca_2AlFeO_5$, $Sr_2Fe_2O_5$, $Sr_2Co_2O_5$, and $Ba_2In_{2-x}Mn_xO_{5+x}$ (x=0 to 0.7).

$Ca_2AlFeO_5$: M. Zoetzl et al., J. Am. Ceram. Soc. 89, 3491 (2006).

$Sr_2Fe_2O_5$: A. Nemudry et al., Chem. Mater. 10, 2403 (1998).

$Sr_2Co_2O_5$: A. Nemudry et al., Chem. Mater. 8, 2232 (1996).

$Ba_2In_{2-x}Mn_xO_{5+x}$: P. Jiang et al., Inorg. Chem. 52, 1349 (2013).

The brownmillerite-type transition metal oxide can be synthesized using a liquid phase reaction method in addition to the solid phase reaction method. In the liquid phase reaction method, as a raw material of oxide of each metal, a salt of the metal such as a nitrate, an acetate, or a citrate is used. For example, when $Ca_2FeCoO_5$ is synthesized, a Ca salt (e.g., $Ca(NO_3)_2$), a Fe salt (e.g., $Fe(NO_3)_3 \cdot 9H_2O$), and a Co salt (e.g., $Co(NO_3)_2 \cdot 6H_2O$) are mixed, citric acid is added thereto as a gelatinizing agent, and the resulting mixture is blended with a solvent such as water (distilled water or ion-exchanged water). The ratio of each metal salt is determined as appropriate considering the composition of the target metal oxide. The amount of citric acid used as a gelatinizing agent can be set to be in a range from 10 to 1000 parts by mass with respect to 100 parts by mass of the metal salts. Not only citric acid but also EDTA (ethylenediaminetetraacetic acid), glycine, or the like can be used as the gelatinizing agent.

The above-mentioned mixture is gelatinized by heating the mixture to 50 to 90° C. to remove the solvent, for example. This gelatinized product is temporarily calcined in the air at 300 to 500° C. (e.g., 450° C.) for 10 minutes to 6 hours (e.g., one hour), for example, to synthesize a precursor. Next, this precursor is calcined in the air at 600 to 800° C. for 1 to 24 hours, for example, and thus $Ca_2FeCoO_5$, which is the product of interest and a brownmillerite-type oxide, can be synthesized. The calcination can also be performed under the calcination conditions in which the precursor is calcined at 600° C. for a predetermined period of time (1 to 12 hours) and then calcined at an increased temperature such as 800° C. for a predetermined period of time (6 to 12 hours), for example. The liquid phase reaction method allows the brownmillerite-type transition metal oxide, which is the product of interest, to be synthesized at a lower temperature compared with the solid phase reaction method, and the resulting oxide is obtained as particles having smaller particle diameters due to the lower calcination temperature. The particles having small particle diameters have large surface areas and thus are expected to have a high activity per unit mass when used as a catalyst. The surface area of the catalyst for an air electrode including the brownmillerite-type transition metal oxide according to the present invention can be set to be in a range from 0.1 to 100 m²/g, and preferably in a range from 1 to 100 m²/g, for example. It should be noted that it is not intended to be limited to this range. The particle diameter of the catalyst for an air electrode including the brownmillerite-type transition metal oxide according to the present invention is 100 μm or less, for example, the particle diameter of the catalyst obtained using the solid phase reaction method is 1 to 50 μm, and preferably 2 to 20 μm, for example, and the particle diameter of the catalyst obtained using the liquid phase reaction method is in a range from 10 to 1000 nm, and preferably a range from 20 to 500 nm, for example. It should be noted that these particle diameters are merely examples.

Although the details will be described in Examples, a brownmillerite-type transition metal oxide is used as a catalyst so that OER activity higher than or equal to that of Pt is exhibited. $Ca_2Fe_2O_5$ exhibits OER activity equal to that of Pt, for example. Furthermore, when $Ca_2FeCoO_5$ obtained by replacing one Fe at the B site with Co was used, a high current of about 6 mA/cm²@1.6V vs RHE due to oxygen evolution was observed in a 0.1 mol dm⁻³ KOH aqueous solution under the conditions shown in Example 1 (see FIG. 5). This is about three times as high as 2 mA/cm²@1.6 V vs RHE obtained when measuring Pt/C under the same conditions, and this activity is over twice higher than those of precious metal oxide catalysts such as $IrO_2$ and $RuO_2$, which was reported in the past. Also, in a high-concentration KOH aqueous solution (4.0 mol dm⁻³) that is considered to be used in a metal-air secondary battery, better OER activity higher than the activity of Pt/C was exhibited in the same manner as in a 0.1 mol dm⁻³ KOH aqueous solution (see FIG. 6). Furthermore, an example shown in Example 2 had an increased surface area and thus exhibited better OER activity than that of $RuO_2$ having a similar surface area (see FIG. 10).

The brownmillerite-type transition metal oxide according to the present invention is very useful in an air electrode and is very favorable as an air electrode used in hydrogen production by photodecomposition of water and in a metal-air secondary battery that is expected as a next-generation high-capacity secondary battery. The fact that is to be noted is that $Ca_2FeCoO_5$ including Fe and Co as a metal located at the B-site is used so that the OER activity significantly increases compared with $Ca_2Fe_2O_5$ including only Fe as a metal located at the B-site. Therefore, $Ca_2FeCoO_5$ is highly likely to exhibit good OER catalyst properties due to a synergistic effect of two types of transition metals (Co, Fe), and it is preferable that $B^1$ and $B^2$ in Formula (1) represent a combination of different elements because better activity of the catalyst for an air electrode may be exhibited.

Air Electrode

The air electrode generally has a porous structure and includes an oxygen reaction catalyst as well as a conductive material. The air electrode may also include an oxygen reduction (ORR) catalyst, a binder, and the like as needed. The air electrode in a secondary battery needs to have OER catalytic activity as a function during charging and ORR catalytic activity as a function during discharging. The catalyst according to the present invention is an OER catalyst, and therefore, the air electrode can contain this catalyst as well as an ORR catalyst. The following is a chemical formula representing charging and discharging in the air electrode.

Chemical Formula 2

Positive electrode

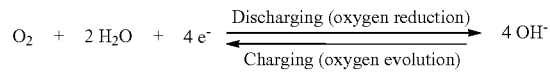

The content of the catalyst (OER catalyst) according to the present invention in the air electrode is not particularly limited, but is preferably 1 to 90 mass %, more preferably 10 to 60mass %, and even more preferably 30 to 50 mass %, for example, from the viewpoint of increasing the oxygen reaction performance of the air electrode.

Examples of the ORR catalyst include Pt or a Pt-based material (e.g., PtCo, PtCoCr, Pt—$W_2C$, or Pt—RuOx), a Pd-based material (e.g., PdTi, PdCr, PdCo, or PdCoAu), a metal oxide (e.g., $ZrO_{2-x}$, $TiO_x$, $TaN_xO_y$, or $IrMO_x$), a complex (Co-porphyrin complex), and others (e.g., $PtMoRuSeO_x$ or RuSe), but are not particularly limited thereto. Furthermore, examples thereof also includes $LaNiO_3$, which was reported to be highly active by Suntivich et al. (Nat. Chem. 3, 546 (2011)), and CoO/N-doped CNT, which was reported by Li et al. (Nat. Commun. 4, 1805 (2013)). It should be noted that it is not intended to be limited thereto. A plurality of catalysts can also be used in combination considering the performance and characteristics of the catalysts. In addition, a co-catalyst (e.g., $TiO_x$, $RuO_2$, or $SnO_2$) can also be used in combination with the above-mentioned catalyst. When the ORR catalyst is used in combination, the content of the ORR catalyst can be determined as appropriate considering the type and the catalytic activity of the ORR catalyst and set to 1 to 90 mass %, for example. It should be noted that it is not intended to be limited to this numerical value range.

Although there is no particular limitation on the conductive material as long as the conductive material can be generally used as a conductive assistant, a preferable example thereof is conductive carbon. Specific examples thereof include mesoporous carbon, graphite, acetylene black, carbon nanotube, and carbon fiber. Conductive carbon having a large specific surface area is preferable because it provides many reaction sites in the air electrode. Specifically, the specific surface area of the conductive carbon is preferably 1 to 3000 $m^2/g$, and particularly preferably 500 to 1500 $m^2/g$. The catalyst for an air electrode may be supported by the conductive material.

The content of the conductive material in the air electrode is preferably 10 to 99 mass %, particularly preferably 20 to 80 mass %, and even more preferably 20 to 50 mass % from the viewpoint of increasing discharging capacity, but is not particularly limited thereto.

When the air electrode contains a binder, the catalyst and the conductive material can be immobilized to improve the cycling properties of a battery. There is no particular limitation on the binder, and examples thereof include polyvinylidene fluoride (PVDF) and a copolymer thereof, polytetrafluoroethylene (PTFE) and a copolymer thereof, and styrene-butadiene rubber (SBR). The content of the binder in the air electrode is preferably 1 to 40 mass %, particularly preferably 5 to 35 mass %, and even more preferably 10 to 35 mass % from the viewpoint of the binding capacity between carbon (conductive material) and the catalyst, but is not particularly limited thereto.

A slurry prepared by dispersing the above-mentioned constituent materials of the air electrode in an appropriate solvent is applied to a base material and dried, and thus the air electrode can be formed. There is no particular limitation on the solvent, and examples thereof include acetone, N,N-dimethylformamide, and N-methyl-2-pyrrolidone (NMP). Generally, it is preferable to mix the constituent materials of the air electrode with the solvent for not less than 3 hours, and preferably not less than 4 hours. There is no particular limitation on the mixing method, and a general method can be used.

There is no particular limitation on the base material to which the slurry is applied, and examples thereof include a glass plate and a Teflon (registered trademark) plate. After the slurry has dried, the base material is peeled off from the resulting air electrode. Alternatively, an air electrode collector or a solid electrolyte layer can be used as the above-mentioned base material. In this case, the base material is not peeled off and is used as it is as a component of the metal-air secondary battery.

There are no particular limitations on the method for applying a slurry and the method for drying a slurry, and general methods can be used. Examples of the application method include a spray method, a doctor blade method, and a gravure printing method, and examples of the drying method include heat drying and vacuum drying.

There is no particular limitation on the thickness of the air electrode, and it is sufficient if the thickness is set as appropriate depending on the application and the like of the metal-air secondary battery. Generally, the thickness is preferably 5 to 100 μm, 10 to 60 μm, and particularly preferably 20 to 50 μm.

Generally, an air electrode collector that collects the current in the air electrode is connected to the air electrode. There are no limitations on the material and the shape of the air electrode collector. Examples of the material of the air electrode collector include stainless steel, aluminum, iron, nickel, titanium, and carbon. Examples of the shape of the air electrode collector include a foil shape, a plate shape, a mesh (grid shape), and a fibrous shape, and a porous shape such as a mesh shape is particularly preferable. This is because the porous collector supplies oxygen to the air electrode with good efficiency.

Metal-Air Secondary Battery

The metal-air secondary battery according to the present invention includes an air electrode that contains a catalyst including the above-mentioned brownmillerite-type transition metal oxide, a negative electrode that contains a negative electrode active material, and an electrolyte that intervenes between the air electrode and the negative electrode. The air electrode of the metal-air secondary battery according to the present invention contains the catalyst including the brownmillerite-type transition metal oxide, and this catalyst exhibits good OER catalyst properties. Accordingly, the metal-air secondary battery according to the present invention including the air electrode using this catalyst has a good charging speed and a good charging voltage.

Also, as mentioned above, a catalyst having ORR catalytic activity can coexist in the air electrode. Alternatively, an electrode for oxygen reduction (ORR) that includes a catalyst having ORR catalytic activity can be provided in addition to the air electrode for oxygen evolution (OER), which contains a catalyst including the brownmillerite-type transition metal oxide. In this case, the metal-air secondary battery includes the air electrode for oxygen reduction and the air electrode for oxygen evolution (three-electrode type). The air electrode for oxygen reduction is used during discharging, and the air electrode for oxygen evolution is used during charging. The catalyst having ORR catalytic activity is as described above, and the air electrode for oxygen evolution can be obtained by using this catalyst and the conductive material and binder mentioned in the above description of the air electrode.

Figure 7:
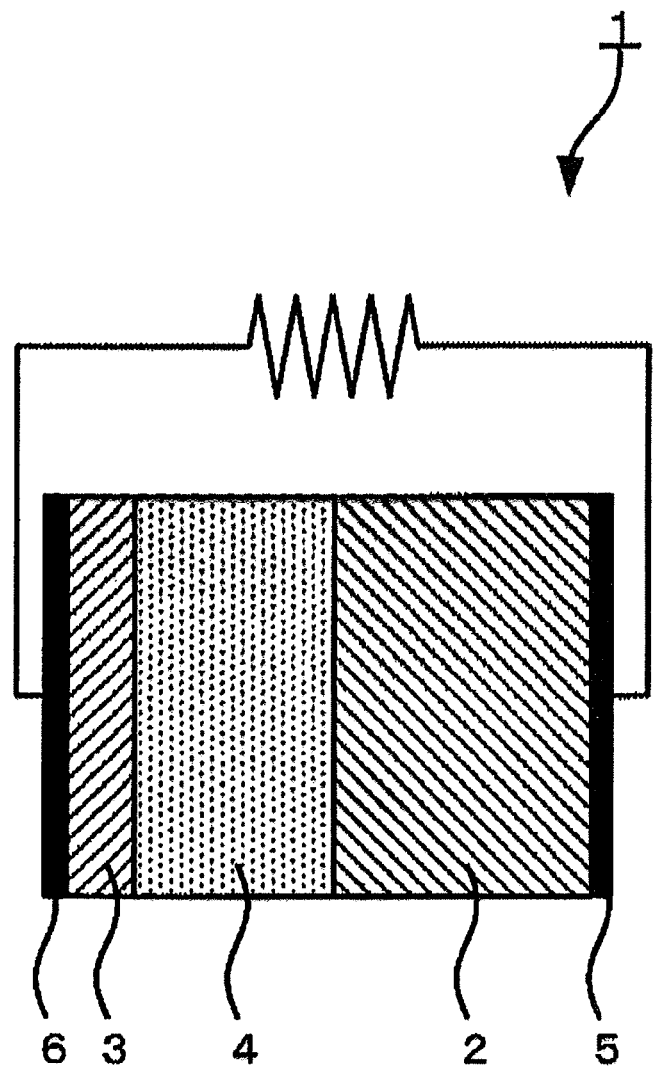
FIG. 7 illustrates an example of the configuration of a metal-air secondary battery according to the present invention.

Hereinafter, an example of the configuration of the metal-air secondary battery according to the present invention will be described. It should be noted that the metal-air secondary battery according to the present invention is not limited to the configuration described below. FIG. 7 is a cross-sectional view illustrating an example of the form of the metal-air secondary battery according to the present invention. A metal-air secondary battery 1 includes an air electrode 2 that uses oxygen as an active material, a negative electrode 3 that contains a negative electrode active material, an electrolyte 4 that performs ionic conduction between the air electrode 2 and the negative electrode 3, an air electrode collector 5 that collects the current in the air electrode 2, and a negative electrode collector 6 that collects the current in the negative electrode 3, and these are accommodated in a battery case (not shown). The air electrode collector 5, which collects the current in the air electrode 2, is electrically connected to the air electrode 2 and has a porous structure that enables oxygen supply to the air electrode 2. The negative electrode collector 6, which collects the current in the negative electrode 3, is electrically connected to the negative electrode 3, and one of the end portions of the air electrode collector 5 and one of the end portions of the negative electrode collector 6 project from the battery case. These end portions of the air electrode collector 5 and the negative electrode collector 6 function as a positive electrode terminal (not shown) and a negative electrode terminal (not shown), respectively.

Negative Electrode

The negative electrode contains the negative electrode active material. There is no particular limitation on the negative electrode active material, and a general negative electrode active material for an air battery can be used. Generally, the negative electrode active material can occlude and release metal ions. Specific examples of the negative electrode active material include a metal such as Li, Na, K, Mg, Ca, Zn, Al, and Fe; an alloy, oxide, and nitride of these metals; and a carbon material.

In particular, a zinc-air secondary battery is superior in terms of safety and is expected as a next-generation secondary battery. It should be noted that a lithium-air secondary battery and a magnesium-air secondary battery are favorable from the viewpoint of high voltage and high output.

An example of the zinc-air secondary battery will be described below, and the following is the reaction formulae.

Negative electrode: $Zn + 4OH^- \rightleftharpoons Zn(OH)_4^{2-} + 2e^-$ (Electrolytic solution) $Zn(OH)_4^{2-} \rightleftharpoons ZnO + H_2O + 2OH^-$ Positive electrode: $O_2 + 2H_2O + 4e^- \rightleftharpoons 4OH^-$ Battery reaction: $2Zn + O_2 \rightleftharpoons 2ZnO$     Chemical Formula 3

In the zinc-air secondary battery according to the present invention, a material that can occlude and release zinc ions is used in the negative electrode. In addition to a zinc metal, a zinc alloy can be used in such a negative electrode. Examples of the zinc alloy include zinc alloys containing one or more elements selected from aluminum, indium, magnesium, tin, titanium, and copper.

Examples of the negative electrode active material of the lithium-air secondary battery include a lithium metal, a lithium alloy such as a lithium-aluminum alloy, a lithium-tin alloy, a lithium-lead alloy, or a lithium-silicon alloy; a metal oxide such as a tin oxide, a silicon oxide, a lithium-titanium oxide, a niobium oxide, or a tungsten oxide; a metal sulfide such as a tin sulfide or a titanium sulfide; a metal nitride such as a lithium-cobalt nitride, a lithium-iron nitride, or a lithium-manganese nitride; and a carbon material such as graphite, and in particular, a lithium metal is preferable.

Furthermore, a material that can occlude and release magnesium ions is used as the negative electrode active material for the magnesium-air secondary battery. In addition to a magnesium metal, a magnesium alloy such as a magnesium-aluminum alloy, a magnesium-silicon alloy, or a magnesium-gallium alloy can be used in such a negative electrode.

When a metal, an alloy, or the like having a foil shape or a plate shape is used as the negative electrode active material, the negative electrode active material having a foil shape or a plate shape itself can be used as the negative electrode.

Although it is sufficient if the negative electrode contains at least the negative electrode active material, a binding material for immobilizing the negative electrode active material may be contained in the negative electrode as needed. The type of binding material, the amount of binding material used, and the like are the same as those in the above-described air electrode, and therefore, the description thereof will be omitted.

Generally, a negative electrode collector that collects the current in the negative electrode is connected to the negative electrode. There is no limitation on the material and the shape of the negative electrode collector. Examples of the material of the negative electrode collector include stainless steel, copper, and nickel. Examples of the shape of the negative electrode collector include a foil shape, a plate shape, and a mesh (grid shape).

Electrolyte

The electrolyte is arranged between the air electrode and the negative electrode. Metal ions are conducted between the negative electrode and the air electrode via the electrolyte. There is no particular limitation on the form of the electrolyte, and examples thereof include a liquid electrolyte, a gel electrolyte, and a solid electrolyte.

When the negative electrode is made of zinc or a zinc alloy, for example, an alkali aqueous solution such as a potassium hydroxide aqueous solution or a sodium hydroxide aqueous solution that contains zinc oxide may be used, or an aqueous solution that contains zinc chloride or zinc perchlorate may be used, or a non-aqueous solvent that contains zinc perchlorate or zinc bis(trifluoromethylsulfonyl)imide may be used. Also, when the negative electrode is made of magnesium or a magnesium alloy, for example, a non-aqueous solvent that contains magnesium perchlorate or magnesium bis(trifluoromethylsulfonyl)imide may be used. Here, examples of the non-aqueous solvent include organic solvents used in conventional secondary batteries and capacitors, such as ethylene carbonate (EC), propylene carbonate (PC), γ-butyrolactone (γ-BL), diethyl carbonate (DEC), and dimethyl carbonate (DMC). These solvents may be used alone or in a combination of two or more. Alternatively, an ionic liquid such as N,N-diethyl-N-methyl-N-(2-methoxyethyl)ammonium bis(trifluoromethylsulfonyl)imide (am) may be used.

It is preferable that the electrolytic solution includes a dendrite formation inhibitor in the secondary battery according to the present invention. It is thought that the dendrite formation inhibitor adsorbs to the surface of the negative electrode during charging to reduce the difference in energy between crystal faces and prevent a preferred orientation, and thus suppresses the formation of a dendrite. Although there is no particular limitation on the dendrite formation inhibitor, at least one selected from the group consisting of polyalkylene imines, polyallyl amines, and unsymmetrical dialkyl sulfones can be used, for example (see JP 2009-93983A, for example). Also, although there is no particular limitation on the amount of the dendrite formation inhibitor used, the inhibitor at an amount with which the electrolytic solution is saturated at the normal temperature under the atmospheric pressure may be used, or the inhibitor may be used as a solvent.

Generally, a liquid electrolyte having lithium ion conductivity is a non-aqueous electrolytic solution containing a lithium salt and a non-aqueous solvent. Examples of the above-mentioned lithium salt include inorganic lithium salts such as $LiPF_6$, $LiBF_4$, $LiClO_4$, and $LiAsF_6$; and organic lithium salts such as $LiCF_3SO_3$, $LiN(CF_3SO_2)_2$, $LiN(C_2F_5SO_2)_2$, and $LiC(CF_3SO_2)_3$.

Examples of the above-mentioned non-aqueous solvent include ethylene carbonate (EC), propylene carbonate (PC), dimethyl carbonate (DMC), diethyl carbonate (DEC), ethyl methyl carbonate (EMC), butylene carbonate, γ-butyrolactone, sulfolane, acetonitrile, 1,2-dimethoxymethane, 1,3-dimethoxypropane, diethyl ether, tetrahydrofuran, 2-methyltetrahydrofuran, and a mixture thereof. An ionic liquid can also be used as the non-aqueous solvent.

The concentration of lithium salt in the non-aqueous electrolytic solution is preferably in a range from 0.1 mol/L to 3 mol/L, and more preferably 1 mol/L, for example, but is not particularly limited thereto. It should be noted that in the present invention, a liquid having a low volatility such as an ionic liquid may be used as the non-aqueous electrolytic solution.

The gel electrolyte having lithium ion conductivity can be obtained by adding a polymer to the above-mentioned non-aqueous electrolytic solution to gelatinize the solution, for example. Specifically, the gelatinization can be performed by adding a polymer such as polyethylene oxide (PEO), polyvinylidene fluoride (PVDF, e.g., Kyner manufactured by Arkema), polyacrylonitrile (PAN), or polymethyl methacrylate (PMMA) to the above-mentioned non-aqueous electrolytic solution.

There is no particular limitation on the solid electrolyte having lithium ion conductivity, and it is possible to use a general solid electrolyte that can be used in a lithium metal-air secondary battery. Examples thereof include oxide solid electrolytes such as $Li_{1.5}Al_{0.5}Ge_{1.5}(PO_4)_3$; and sulfide solid electrolytes such as a $Li_2S$—$P_2S_5$ compound, a $Li_2S$—$SiS_2$ compound, and a $Li_2S$—$GeS_2$ compound.

Although the thickness of the electrolyte greatly varies depending on the configuration of the battery, it is preferable to set the thickness to be in a range from 10 μm to 5000 μm, for example.

Additional Configuration

It is preferable to arrange a separator between the air electrode and the negative electrode in the metal-air secondary battery according to the present invention in order to reliably perform electrical insulation between these electrodes. There is no particular limitation on the separator as long as the separator allows the electrical insulation to be secured between the air electrode and the negative electrode and has a structure in which the electrolyte can intervene between the air electrode and the negative electrode.

Examples of the separator include porous membranes made of polyethylene, polypropylene, cellulose, polyvinylidene fluoride, glass ceramics, and the like; and nonwoven fabrics made of a resin, glass fiber, and the like. In particular, the separator made of glass ceramics is preferable.

A typical battery case for a metal-air secondary battery can be used as the battery case for accommodating the metal-air secondary battery. There is no particular limitation on the shape of the battery case as long as the air electrode, the negative electrode, and the electrolyte mentioned above can be held, and specific examples thereof include a coin shape, a flat plate shape, a cylindrical shape, and a laminate shape.

In the metal-air secondary battery according to the present invention, discharging can be performed by supplying oxygen serving as an active material to the air electrode. Examples of the oxygen supply source include air and oxygen gas, and oxygen gas is preferable. There is no particular limitation on the supply pressure of air or oxygen gas, and it is sufficient if the supply pressure is set as appropriate.

The catalyst for an air electrode including the brownmillerite-type transition metal oxide according to the present invention is useful in a metal-air secondary battery as well as other fields in which an OER electrode catalyst is used. The OER electrode catalyst has been studied or used as a counter electrode reaction of various electrochemical reactions for a long time, and can be diverted for an electrolytic technique such as alkali metal plating or electrolytic degreasing, and an electrolytic protection technique. Recently, the application of the combination of the OER electrode and a solar battery or a photocatalyst is anticipated as being a highly efficient clean hydrogen producing technique.

EXAMPLES

Hereinafter, the present invention will be described more specifically by way of examples, but the present invention is not limited to the following examples.

Example 1

Synthesis Method

The brownmillerite-type transition metal oxides: $Ca_2Fe_2O_5$, $Ca_2FeCoO_5$, and $Ca_2FeMnO_5$ were synthesized as follows. Mixtures were obtained using $CaCO_3$, $Fe_2O_3$, $Co_3O_4$, and $Mn_2O_3$ as raw materials. $Ca_2Fe_2O_5$ and $Ca_2FeCoO_5$ were synthesized by performing calcination in the air at 1100° C. for 12 hours and at 1200° C. for 12 hours, and $Ca_2FeMnO_5$ was synthesized by performing calcination in an argon flow at 1100° C. for 12 hours (solid phase reaction method).

Samples were evaluated with the following method.

Figure 1:
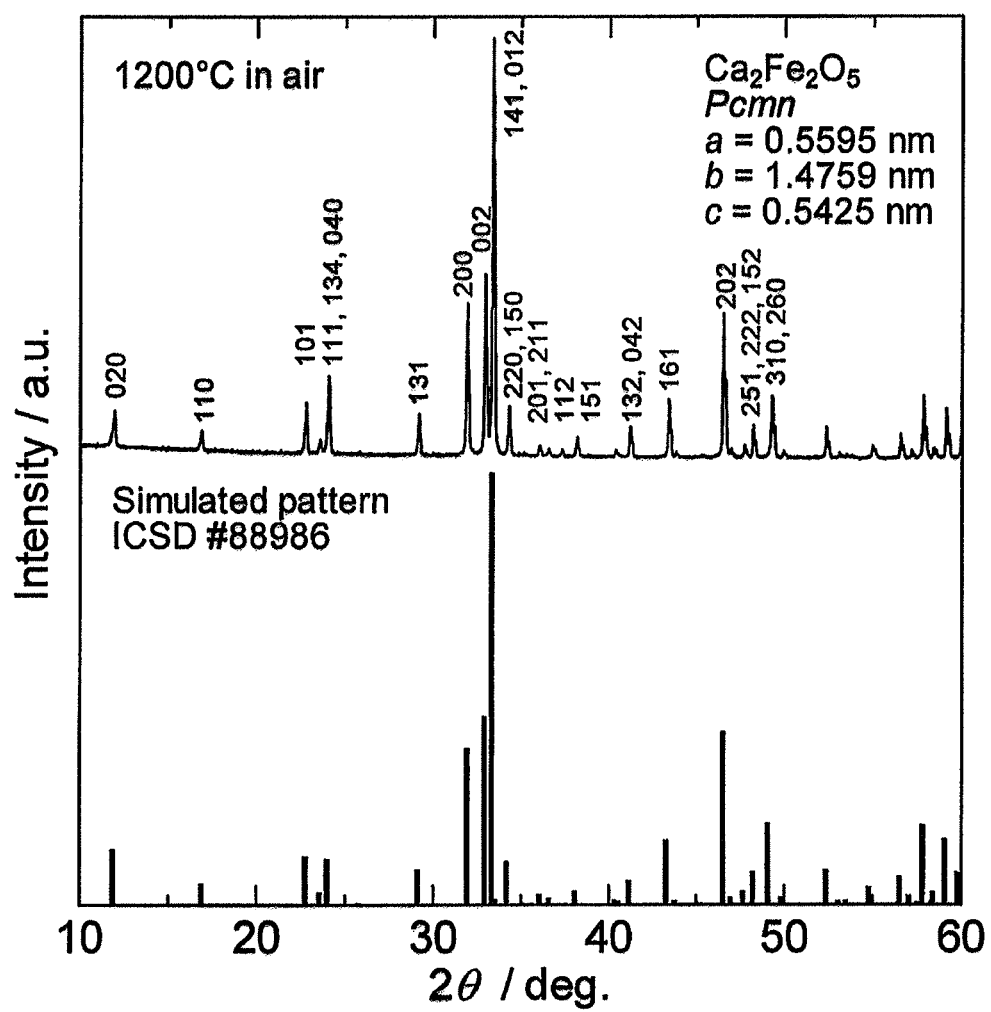
FIG. 1 illustrates an X-ray diffraction pattern of $Ca_2Fe_2O_5$ synthesized in Examples.
Figure 2:
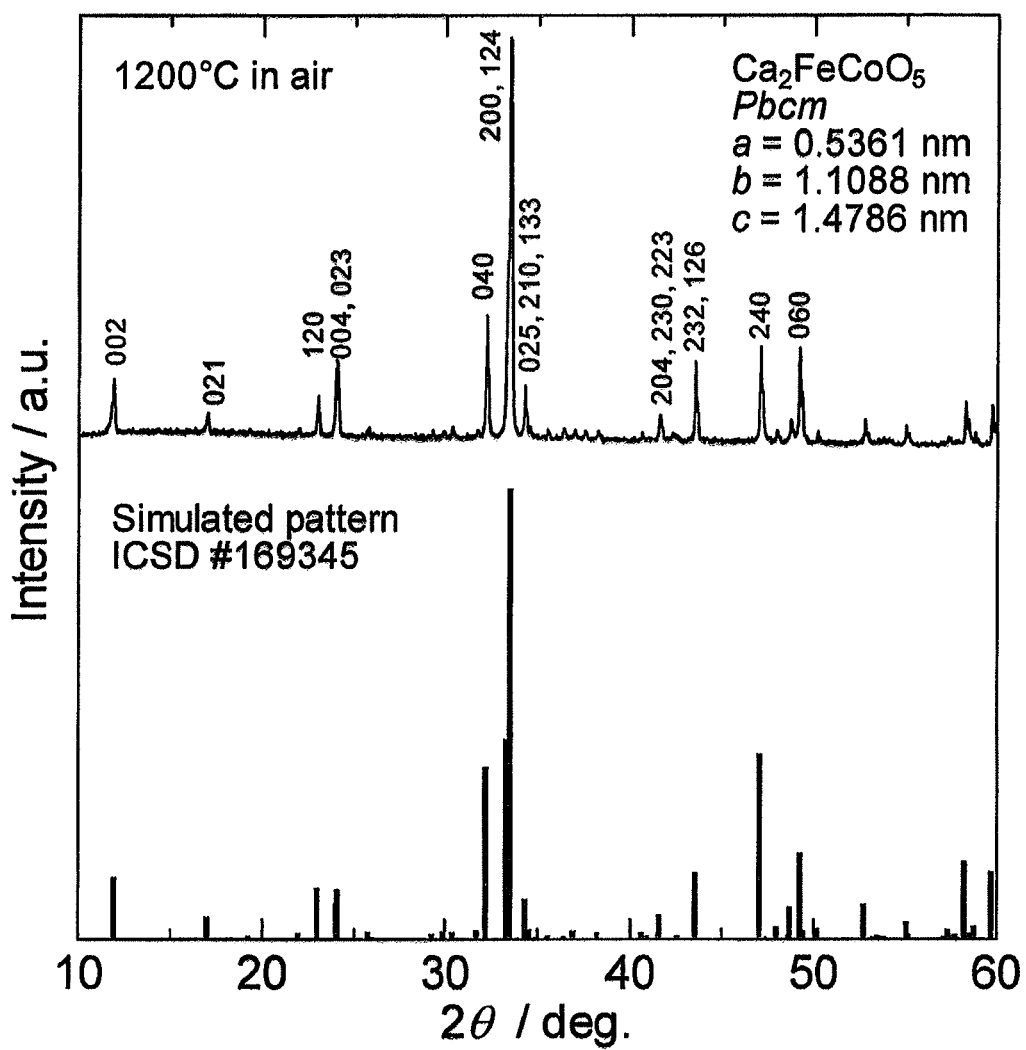
FIG. 2 illustrates an X-ray diffraction pattern of $Ca_2FeCoO_5$ synthesized in Examples.
Figure 3:
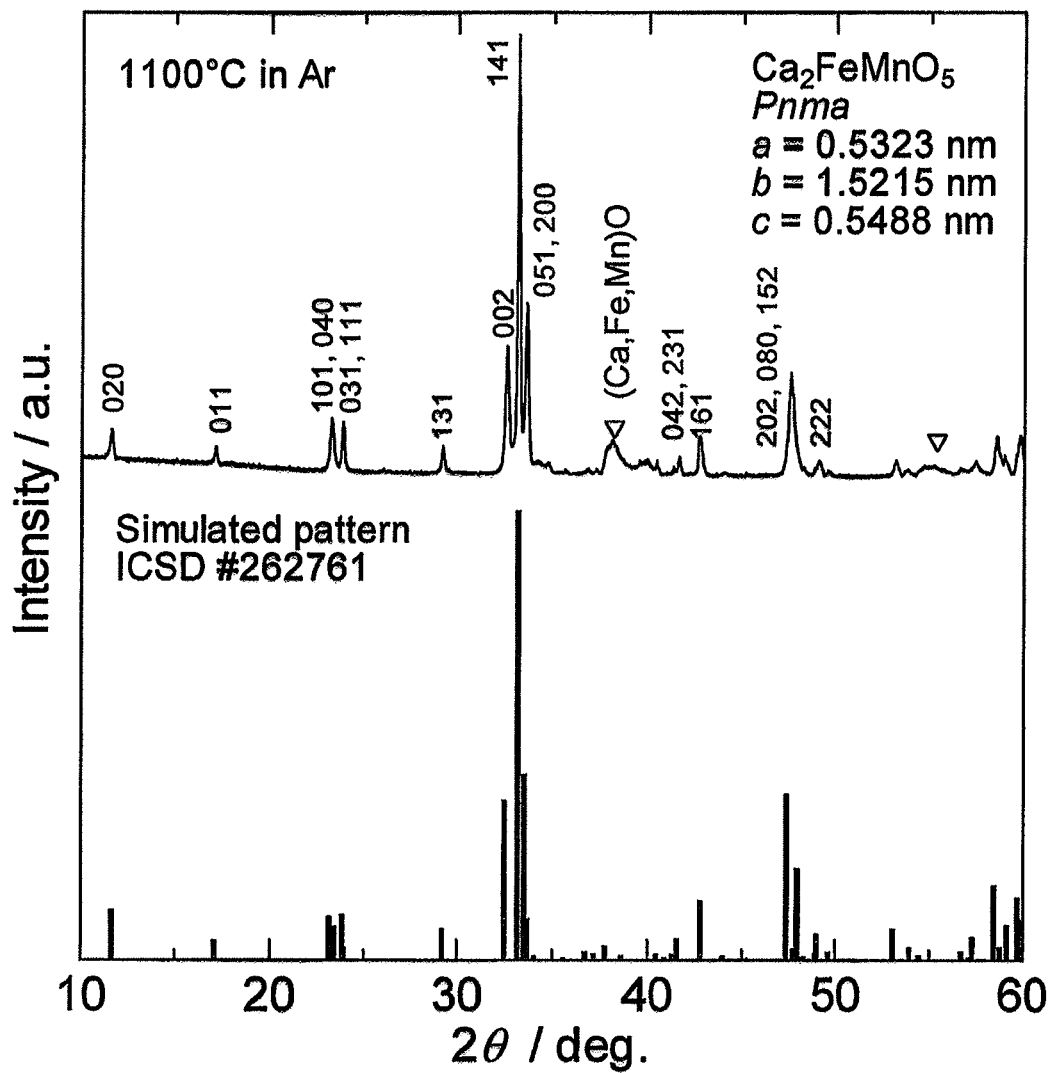
FIG. 3 illustrates an X-ray diffraction pattern of $Ca_2FeMnO_5$ synthesized in Examples.

Phase identification:

X-ray diffraction, Rigaku Ultima IV equipped with a high-speed one dimensional semiconductor detector The obtained samples were subjected to the phase identification and structure analysis by X-ray diffraction (FIGS. 1 to 3). It was confirmed from the X-ray diffraction patterns determined by a simulation and the previous reports (Non-Patent Documents 3 to 6) that the single-phase $Ca_2Fe_2O_5$, $Ca_2FeCoO_5$, and $Ca_2FeMnO_5$ were synthesized using the solid phase reaction method (a small amount of impurities were mixed in $Ca_2FeMnO_5$).

$Ca_2Fe_2O_5$
Pcmn
a=0.5595 nm
b=1.4827 nm
c=0.5407 nm

Non-Patent Document 3: P. Berastegui et al., Mater. Res. Bull. 1999, 34, 303.

$Ca_2FeCoO_5$
Pbcm
a=0.5365 nm
b=1.1100 nm
c=1.4798 nm

Non-Patent Document 4: F. Ramezanipour et al., Chem. Mater. 2010, 22, 6008.

$Ca_2Fe_{2-x}Mn_xO_5$
Pnma
x=0.96:
a=0.53055 nm
b=1.5322 nm
c=0.54587 nm
x=0.67:
a=0.53385 nm
b=1.5154 nm
c=0.55009 nm Non-Patent Document 5: F. Ramezanipour et al., J. Solid State Chem. 2009, 182, 153.

Non-Patent Document 6: F. Ramezanipour et al., J. Am. Chem. Soc. 2012, 134, 3215.

Figure 4:
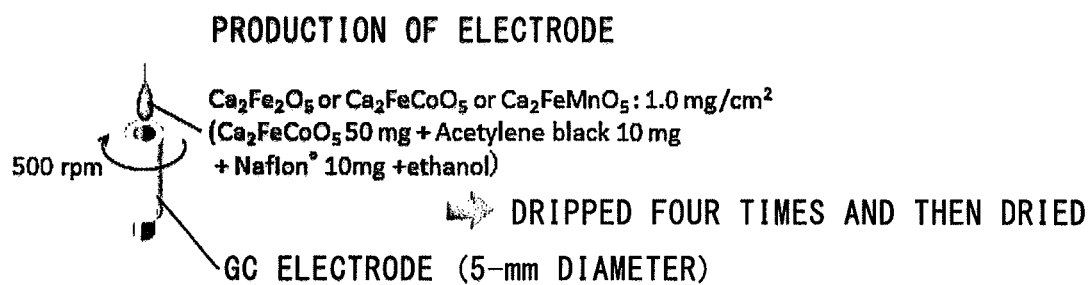
FIG. 4 is an explanatory diagram illustrating the production of an electrode for electrochemical measurement.

Production of Electrode 50 mg of obtained $Ca_2Fe_2O_5$, $Ca_2FeCoO_5$, or $Ca_2FeMnO_5$, acetylene black that had been immersed in nitric acid at 80° C. overnight and then cleaned and dried, and Nafion (registered trademark) that had been neutralized using NaOH were mixed at a weight ratio of 5:1:1, and an appropriate amount of ethanol was added thereto to prepare a catalyst suspension. This suspension was dripped onto a glassy carbon (GC) electrode (having a diameter of 5 mm) four times such that the rate of the brownmillerite-type transition metal oxide catalyst was 1.0 mg/cm$^2$, and then dried at room temperature, so that an OER catalyst was obtained (see FIG. 4). For the purpose of comparison, Ketjen black (KB) and a dinitrodiamine platinum (II) nitric acid solution were mixed and reacted in an oil bath at 100° C. for 4 hours and then cleaned and dried to synthesize a 30 wt % Pt/KB precious metal catalyst. This catalyst was applied to a GC electrode in the same manner as mentioned above.

Electrochemical Measurement

Electrochemical measurement was performed using a three-electrode type electrochemical cell made of Teflon (registered trademark). A platinum plate was used as a counter electrode, and a Hg/HgO/0.1 mol dm$^{-3}$ KOH aq. was used as a reference electrode. A sweep was performed at a sweep speed of 1 mV/s in a predetermined potential range, and a 0.1 mol dm$^{-3}$ KOH aqueous solution and a 4.0 mol dm$^{-3}$ KOH aqueous solution were used as the electrolytic solution.

The electrochemical measurement was performed under the following conditions according to a commonly used procedure.

Figure 5:
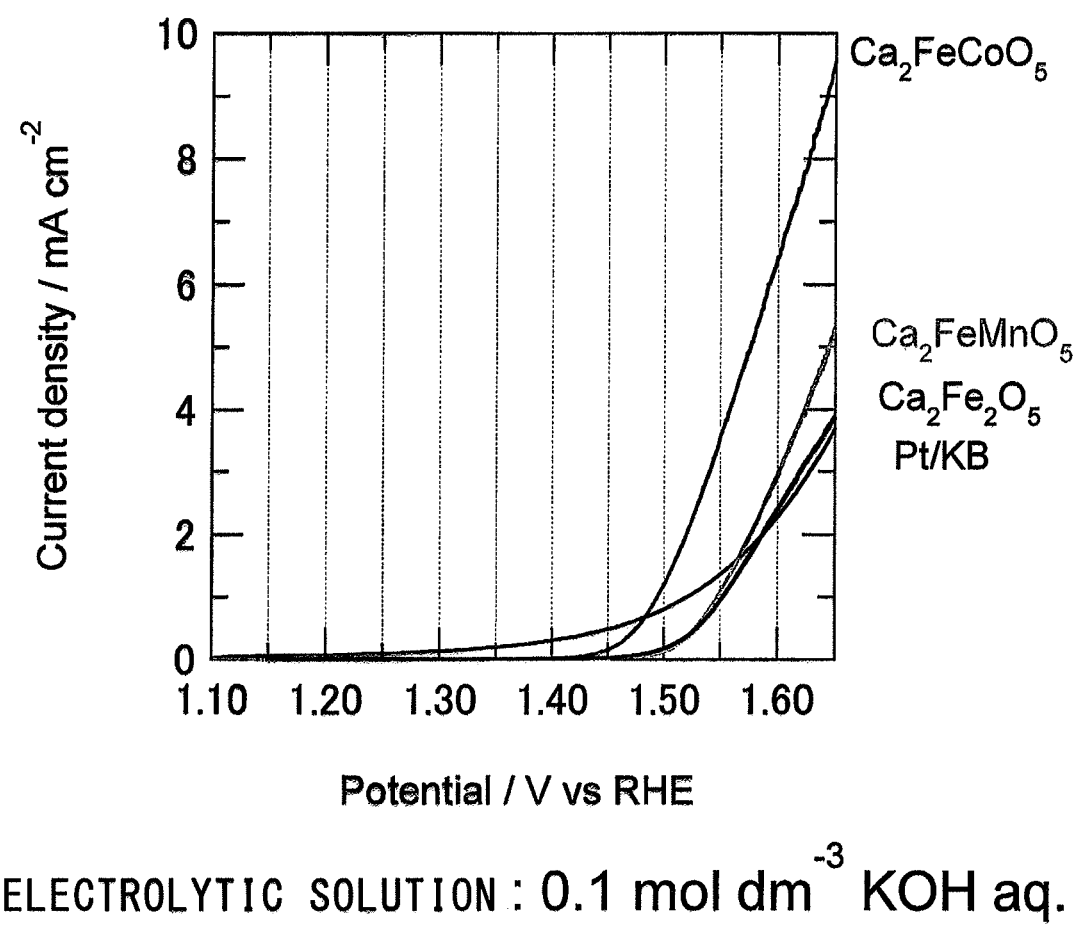
FIG. 5 illustrates results of electrochemical measurement (electrolytic solution: 0.1 mol/dm⁻³ KOH aq.).
Figure 6:
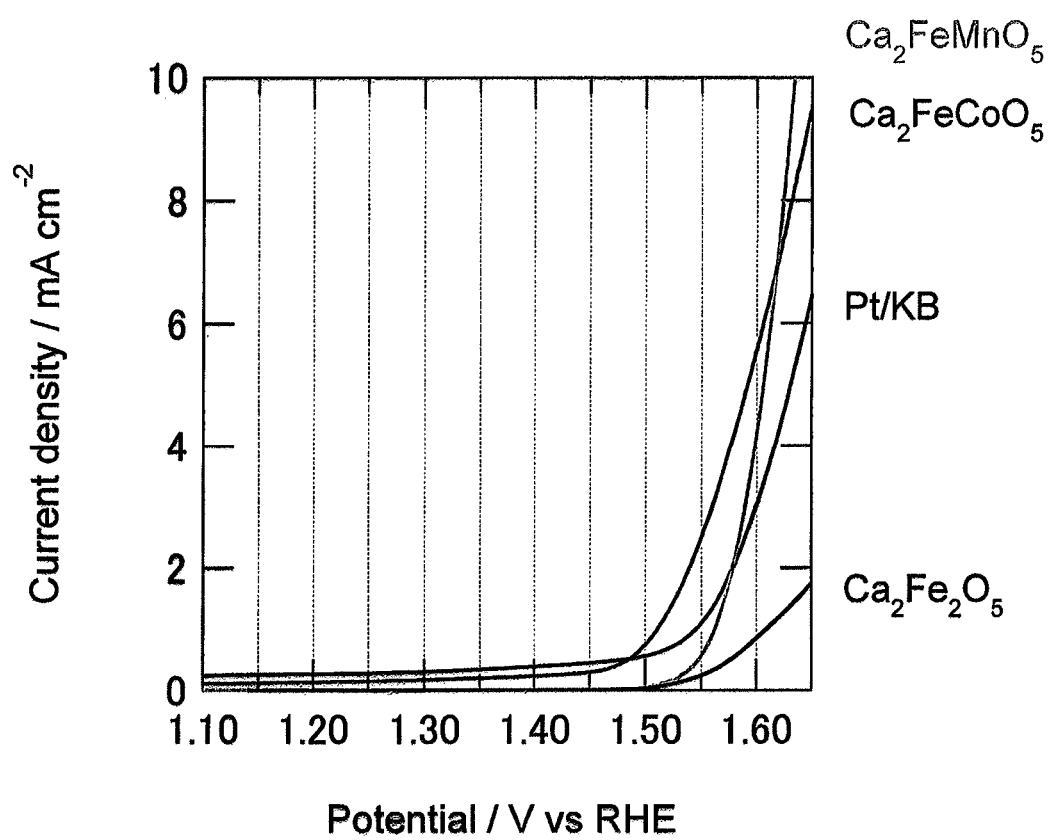
FIG. 6 illustrates results of electrochemical measurement (electrolytic solution: 4.0 mol/dm⁻³ KOH aq.).

WE: $Ca_2Fe_2O_5$ or $Ca_2FeCoO_5$ or $Ca_2FeMnO_5$/GC
CE: Pt
RE: Hg/HgO/0.1 mol dm$^{-3}$ KOH aq.
Electrolytic solution: 0.1 or 4.0 mol/dm$^3$ KOH aq.
Sweep range: −0.8 to 0.66 V vs. Hg/HgO/0.1 mol dm$^{-3}$ KOH aq.
Sweep speed: 1 mV/sec As a result of the electrochemical measurement using $Ca_2Fe_2O_5$, $Ca_2FeCoO_5$, and $Ca_2FeMnO_5$ in a 0.1 mol dm$^{-3}$ KOH aqueous solution as shown in FIG. 5, when $Ca_2Fe_2O_5$ and $Ca_2FeMnO_5$ were used, a current due to the OER started to be observed at about 1.5 V vs RHE, and when $Ca_2FeCoO_5$ was used, a current due to the OER started to be observed at about 1.4 V vs RHE. With regard to a current value at 1.6 V vs RHE, the current value in the case of $Ca_2Fe_2O_5$ was substantially the same as that in the case of Pt/KB (about 2 mA/cm$^2$), and the current value in the case of $Ca_2FeCoO_5$ or $Ca_2FeMnO_5$ was higher than that in the case of Pt/KB. In particular, when $Ca_2FeCoO_5$ was used, a current (about 6 mA/cm$^2$) was observed that was three times as high as that in the case of Pt/KB, and this current value was twice as high as those in the case of $IrO_2$ (about 3 mA/cm$^2$) and $RuO_2$ (about 2.5 mA/cm$^2$) described in Non-Patent Document 1, which are precious metal oxide catalysts having OER activity higher than that of Pt. It was found from the results above that the brownmillerite-type $Ca_2FeCoO_5$ catalyst exhibited activity against the OER that was significantly higher than those of the precious metal catalysts, which were previously reported.

When these are applied as an air electrode of a metal-air secondary battery that is expected as a next-generation high-capacity secondary battery, it is thought that the electrodes need to be used in a high-concentration alkali electrolytic solution such as a 4.0 mol dm$^{-3}$ KOH aqueous solution. Therefore, the measurement was performed in the same manner (see FIG. 6). When $Ca_2FeCoO_5$ was used, a current (about 6 mA/cm$^2$) that was about twice as high as that in the case of Pt/KB (about 3 mA/cm$^2$) at 1.6 V vs RHE was observed, and it was thus revealed that catalytic activity better than those of precious metal OER catalysts was exhibited even in the high-concentration alkali electrolytic solution. Since these catalysts are oxide catalysts that contain no precious metals and include only transition metals, it is thought that these catalysts are very useful for practical application of the metal-air secondary battery in future from the viewpoint of cost and reserves. Moreover, the results shown in FIG. 6 indicate a possibility that $Ca_2FeCoO_5$ can be used to provide an air secondary battery having a charging and discharging efficiency of not less than 60% depending on the conditions.

Example 2

A liquid phase synthesis method for synthesizing $Ca_2FeCoO_5$, which is a brownmillerite-type transition metal oxide, will be described below. $Ca(NO_3)_2·4H_2O$, $Fe(NO_3)_3·9H_2O$, $Co(NO_3)_2·6H_2O$, and citric acid (CA) were used as raw materials and mixed at a ratio of Ca:Fe:Co:CA=2:1:1:4. 16 g of the resulting mixture and 100 g of water were mixed to prepare an aqueous solution. The resulting aqueous solution was heated to about 70° C. to remove the solvent and perform gelatinization. This gelatinized mixture was temporarily calcined in the air at 450° C. for 1 hour to synthesize a precursor. Next, this precursor was calcined in the air at 600° C. for 6 hours. A sample obtained by additionally performing calcination at 800° C. for 12 hours was also produced.

The brownmillerite-type transition metal oxide $Ca_2FeCoO_5$ obtained using the liquid phase reaction method or $Ca_2FeCoO_5$ obtained in Example 1 above (solid phase reaction method), acetylene black that had been immersed in nitric acid at 80° C. overnight and then cleaned and dried, and Nafion (registered trademark) that had been neutralized using NaOH were mixed at a weight ratio of 5:1:1, and an appropriate amount of ethanol was added thereto to prepare a catalyst suspension. This suspension was dripped onto a glassy carbon (GC) electrode such that the rate of the brownmillerite-type transition metal oxide catalyst was 1.0 mg/cm$^2$, and then dried at room temperature, so that an OER catalyst was obtained. For the purpose of comparison, electrodes in which commercially available $IrO_2$ (0.89 m$^2$/g) and $RuO_2$ (8.38 m$^2$/g) were used instead of $Ca_2FeCoO_5$ were also evaluated.

Electrochemical measurement was performed using a three-electrode type electrochemical cell made of Teflon (registered trademark). A platinum plate was used as a counter electrode, and a Hg/HgO/KOH was used as a reference electrode. A sweep was performed at a sweep speed of 1 mV/s in a predetermined potential range, and assuming the application to an air electrode of a metal-air secondary battery, a 4.0 mol dm$^{-3}$ KOH aqueous solution, which is a high-concentration alkali electrolytic solution, was used as the electrolytic solution.

Figure 8:
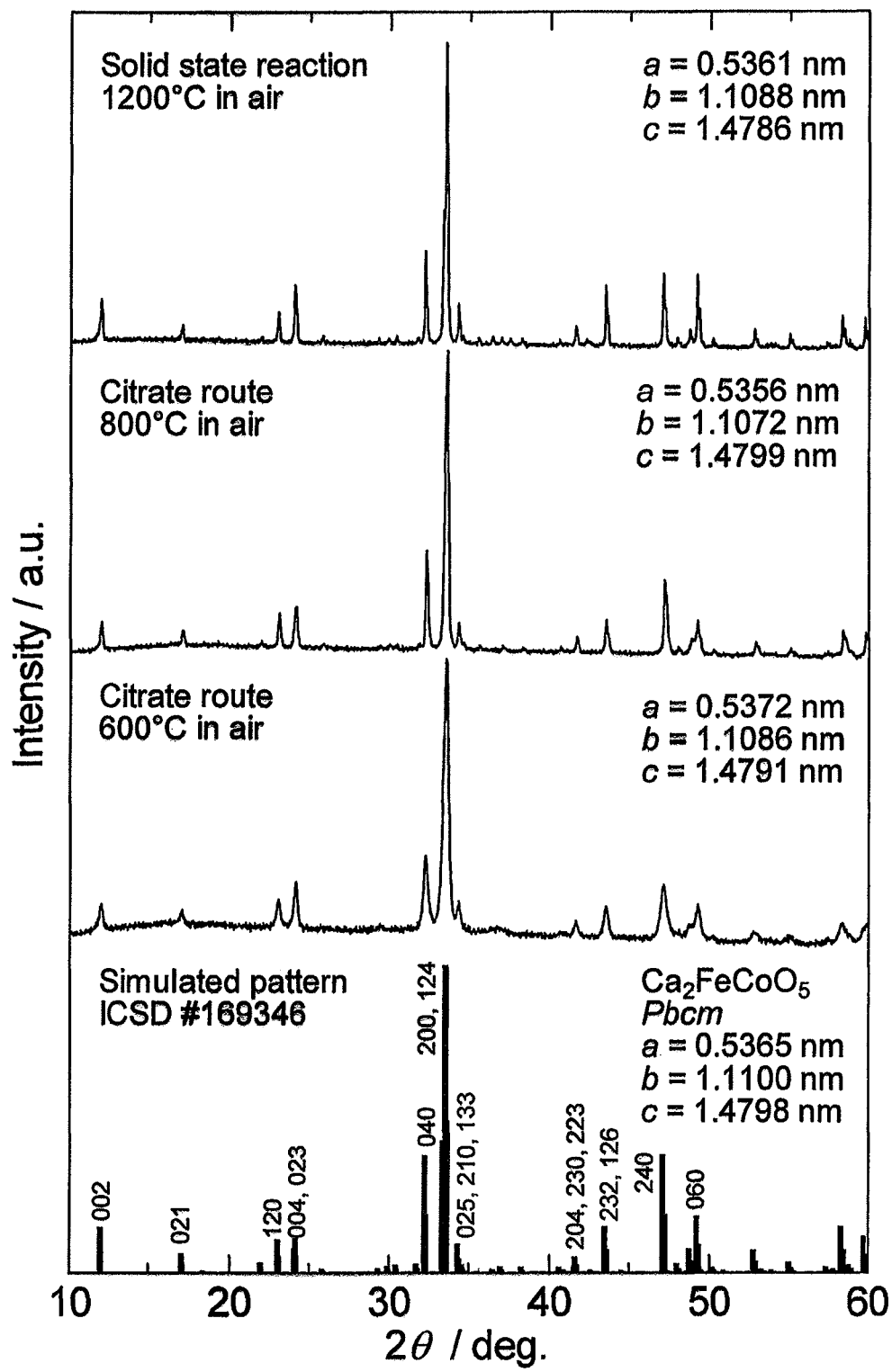
FIG. 8 illustrates $Ca_2FeCoO_5$ X-ray diffraction patterns of samples obtained using a solid phase reaction method (Example 1) and a liquid phase reaction method (Example 2) and a $Ca_2FeCoO_5$ X-ray diffraction pattern determined by a simulation.

FIG. 8 illustrates $Ca_2FeCoO_5$ X-ray diffraction patterns of the samples obtained using the solid phase reaction method and the phase reaction method and a $Ca_2FeCoO_5$ X-ray diffraction pattern determined by a simulation. A peak assigned to $Ca_2FeCoO_5$ was also confirmed in the sample synthesized in this example (liquid phase reaction method), and it can be seen that the single-phase was synthesized.

Figure 9:
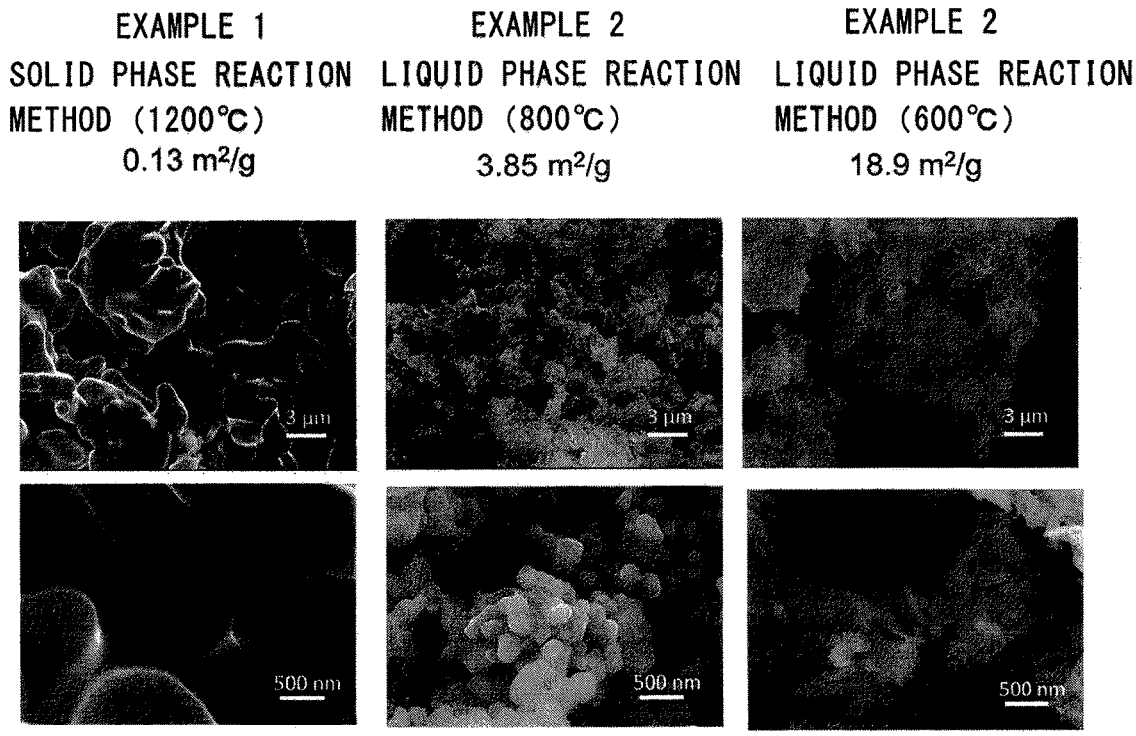
FIG. 9 illustrates scanning electron micrographs of $Ca_2FeCoO_5$ obtained using a solid phase reaction method (Example 1) and a liquid phase reaction method (Example 2).

FIG. 9 illustrates scanning electron micrographs of $Ca_2FeCoO_5$ obtained using the solid phase reaction method and the liquid phase reaction method. $Ca_2FeCoO_5$ obtained using the solid phase reaction method (Example 1) had a particle diameter of 10 to 5 µm, whereas $Ca_2FeCoO_5$ synthesized using the liquid phase reaction method (Example 2) at 800° C. had a particle diameter of about 200 to 400 nm, and $Ca_2FeCoO_5$ synthesized with the liquid phase reaction method at 600° C. was micronized and had a particle diameter of about 50 to 20 nm. As is clear from BET surface areas, $Ca_2FeCoO_5$ synthesized using the solid phase reaction method had a BET surface area of 0.13 m²/g, whereas $Ca_2FeCoO_5$ synthesized using the liquid phase reaction method at 800° C. had a BET surface area of 3.85 m²/g, and $Ca_2FeCoO_5$ synthesized using the liquid phase reaction method at 600° C. had a BET surface area of 18.9 m²/g, which was over 100 times higher.

Figure 10:
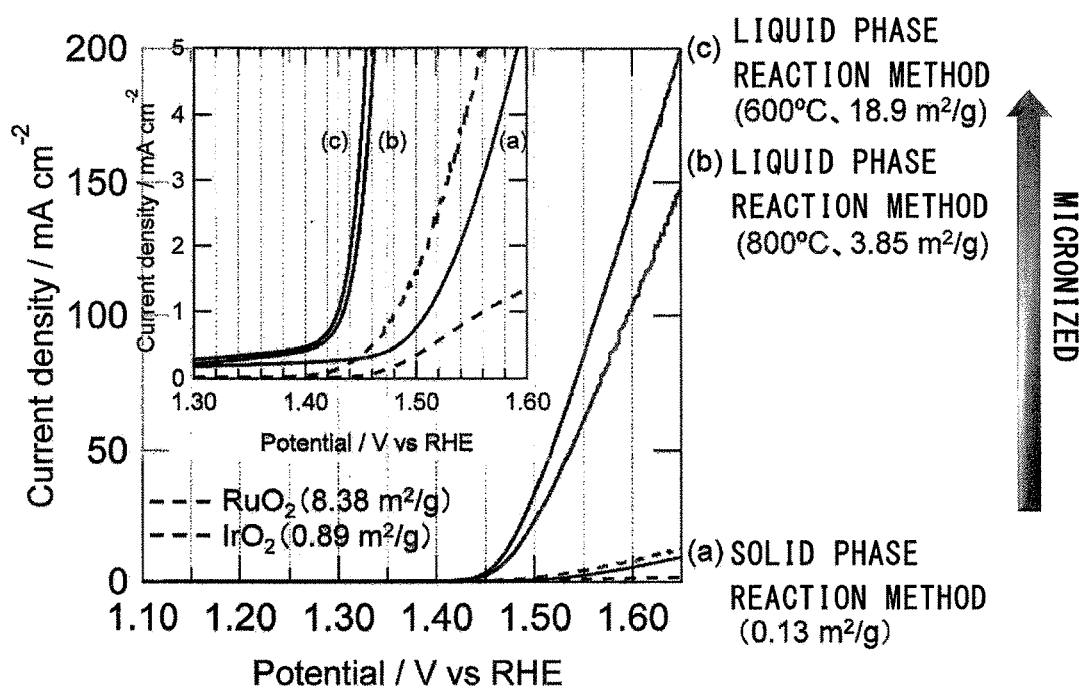
FIG. 10 illustrates results of electrochemical measurement using $Ca_2FeCoO_5$ obtained using a solid phase reaction method (Example 1) and a liquid phase reaction method (Example 2).

FIG. 10 illustrates the results of electrochemical measurement using $Ca_2FeCoO_5$ obtained using the solid phase reaction method and the liquid phase reaction method. FIG. 10 also illustrates the measurement results of $IrO_2$ and $RuO_2$, which are said to currently have the highest OER activity of the precious metal oxide catalysts. When $Ca_2FeCoO_5$ obtained using the solid phase reaction method (Example 1) was used, a current due to the OER started to be observed at about 1.48 V vs RHE, and it can be seen that the current at 1.6 V vs RHE was about 6 mA/cm². In contrast, when $Ca_2FeCoO_5$ obtained using the liquid phase reaction method (Example 2) was used, a current due to the OER started to be observed at about 1.42 V vs RHE in both the cases of the sample synthesized at 800° C. and the sample synthesized at 600° C. The current at 1.6 V vs RHE was about 100 mA/cm² in the case of the sample synthesized at 800° C., and the current at 1.6 V vs RHE was about 140 mA/cm² in the case of the sample synthesized at 600° C. Thus, this observed current was up to over 20 times higher than that of $Ca_2FeCoO_5$ obtained using the solid phase reaction method. It can be seen that activity was increased due to the increased surface area.

INDUSTRIAL APPLICABILITY

The present invention is useful in the fields of a secondary battery, a metal-air secondary battery that is expected as a next-generation high-capacity secondary battery, and hydrogen production by photodecomposition of water.

The invention claimed is:

1. A zinc-air secondary battery comprising:
an air electrode including an oxygen evolution catalyst containing a brownmillerite-type transition metal oxide, said oxygen evolution catalyst causing an oxygen evolution reaction represented by Formula below:

$$4OH^- \rightarrow O_2 + 4e^-;$$

a negative electrode containing zinc as a negative electrode active material; and
an electrolyte intervening between said air electrode and said negative electrode, said electrolyte being selected from the group consisting of an alkali aqueous solution and an aqueous solution containing zinc chloride or zinc perchlorate and in contact with said air electrode,
wherein said brownmillerite-type transition metal oxide is represented by General Formula (1) below:

$$A_2B^1B^2O_5 \quad (1)$$

where A represents Ca, Sr, Ba, or a rare earth element (RE),
$B^1$ is a metal atom that forms a tetrahedral structure together with oxygen atoms, and is at least one metal atom selected from the group consisting of Fe, Co, Ni, and Zn,
$B^2$ is a metal atom that forms an octahedral structure together with oxygen atoms, and is at least one metal atom selected from the group consisting of Fe, Co, Cr, Ni, Ti, and Cu, and
one of said $B^1$ and $B^2$ contains Co.

2. The zinc-air secondary battery according to claim 1, wherein a chemical reaction for charging and discharging in the air electrode is represented by Formula below:

Positive electrode $$O_2 + 2H_2O + 4e^- \underset{\text{Charging (oxygen evolution)}}{\overset{\text{Discharging (oxygen reduction)}}{\rightleftharpoons}} 4OH^-.$$

3. The zinc-air secondary battery according to claim 1, wherein said brownmillerite-type transition metal oxide is $Ca_2FeCoO_5$ or $Sr_2Co_2O_5$.

4. The zinc-air secondary battery according to claim 1, wherein a surface area of said catalyst is in a range from 0.1 to 100 m²/g.

5. The zinc-air secondary battery according to claim 1, wherein said air electrode contains said brownmillerite-type transition metal oxide as a catalyst for oxygen evolution, the air electrode further comprising a catalyst for oxygen reduction.

6. The zinc-air secondary battery according to claim 1, further comprising an air electrode for oxygen reduction including a catalyst for oxygen reduction.

7. A zinc-air secondary battery comprising:
an air electrode including an oxygen evolution catalyst containing a brownmillerite-type transition metal oxide, said oxygen evolution catalyst causing an oxygen evolution reaction represented by Formula below:

$$4OH^- \rightarrow O_2 + 2H_2O + 4e^-;$$

a negative electrode containing zinc as a negative electrode active material; and
an electrolyte intervening between said air electrode and said negative electrode, said electrolyte being selected from the group consisting of an alkali aqueous solution and an aqueous solution containing zinc chloride or zinc perchlorate and in contact with said air electrode,
wherein said brownmillerite-type transition metal oxide is represented by General Formula (1) below:

$$A_2B^1B^2O_5 \quad (1)$$

where A represents Ca, Sr, Ba, or a rare earth element (RE),
$B^1$ is a metal atom that forms a tetrahedral structure together with oxygen atoms, and is at least one metal atom selected from the group consisting of Fe, Co, Ni, and Zn,
$B^2$ is a metal atom that forms an octahedral structure together with oxygen atoms, and is at least one metal atom selected from the group consisting of Fe, Co, Cr, Ni, Ti, and Cu, and
said $B^1$ and $B^2$ represent different elements.

8. The zinc-air secondary battery according to claim 7, wherein one of said $B^1$ and $B^2$ contains Co.

9. The zinc-air secondary battery according to claim 7, wherein a chemical reaction for charging and discharging in the air electrode is represented by Formula below:

Positive electrode $$O_2 + 2H_2O + 4e^- \underset{\text{Charging (oxygen evolution)}}{\overset{\text{Discharging (oxygen reduction)}}{\rightleftarrows}} 4OH^-. \quad (5)$$

10. The zinc-air secondary battery according to claim 7, wherein said brownmillerite-type transition metal oxide is $Ca_2FeCoO_5$.

11. The zinc-air secondary battery according to claim 7, wherein a surface area of said catalyst is in a range from 0.1 to 100 m²/g.

12. The zinc-air secondary battery according to claim 7, wherein said air electrode contains said brownmillerite-type transition metal oxide as a catalyst for oxygen evolution, the air electrode further comprising a catalyst for oxygen reduction.

13. The zinc-air secondary battery according to claim 7, further comprising an air electrode for oxygen reduction including a catalyst for oxygen reduction.

14. An electrolytic method comprising:
preparing an electrode comprising an oxygen evolution catalyst which contains a brownmillerite-type transition metal oxide, said oxygen evolution catalyst causing an oxygen evolution reaction represented by Formula below:

$4OH^- \rightarrow O_2 + 2H_2O + 4e^-$; and putting said electrode in an electrolytic solution selected from the group consisting of an alkali aqueous solution and an aqueous solution containing zinc chloride or zinc perchlorate,
wherein said brownmillerite-type transition metal oxide is represented by General Formula (1) below:

$A_2B^1B^2O_5$ (1)

where A represents Ca, Sr, Ba, or a rare earth element (RE),
$B^1$ is a metal atom that forms a tetrahedral structure together with oxygen atoms, and is at least one metal atom selected from the group consisting of Fe, Co, Ni, and Zn,
$B^2$ is a metal atom that forms an octahedral structure together with oxygen atoms, and is at least one metal atom selected from the group consisting of Fe, Co, Cr, Ni, Ti, and Cu, and
one of said $B^1$ and $B^2$ contains Co.

15. The electrolytic method according to claim 14, wherein said brownmillerite-type transition metal oxide is $Ca_2FeCoO_5$ or $Sr_2Co_2O_5$.

16. An electrolytic method comprising:
preparing an electrode comprising an oxygen evolution catalyst which contains a brownmillerite-type transition metal oxide, said oxygen evolution catalyst causing an oxygen evolution reaction represented by Formula below:

$4OH^- \rightarrow O_2 + 2H_2O + 4e^-$; and putting said electrode in an electrolytic solution selected from the group consisting of an alkali aqueous solution and an aqueous solution containing zinc chloride or zinc perchlorate,
wherein said brownmillerite-type transition metal oxide is represented by General Formula (1) below:

$A_2B^1B^2O_5$ (1)

where A represents Ca, Sr, Ba, or a rare earth element (RE),
$B^1$ is a metal atom that forms a tetrahedral structure together with oxygen atoms, and is at least one metal atom selected from the group consisting of Fe, Co, Ni, and Zn,
$B^2$ is a metal atom that forms an octahedral structure together with oxygen atoms, and is at least one metal atom selected from the group consisting of Fe, Co, Cr, Ni, Ti, and Cu, and
said $B^1$ and $B^2$ represent different elements.

17. The electrolytic method according to claim 16, wherein said brownmillerite-type transition metal oxide is $Ca_2FeCoO_5$.

* * * * *